US007703793B2

(12) United States Patent
Kovach

(10) Patent No.: US 7,703,793 B2
(45) Date of Patent: Apr. 27, 2010

(54) FIFTH WHEEL HITCH ASSEMBLY

(76) Inventor: James William Kovach, Box 16333, Munds Park, AZ (US) 86017

(*) Notice: Subject to any disclaimer, the term of this patent is extended or adjusted under 35 U.S.C. 154(b) by 257 days.

(21) Appl. No.: 11/724,848

(22) Filed: Mar. 16, 2007

(65) Prior Publication Data

US 2008/0224443 A1 Sep. 18, 2008

(51) Int. Cl.
*B60D 1/50* (2006.01)

(52) U.S. Cl. ...................... 280/483; 280/484; 280/485; 280/486; 280/439; 280/901

(58) Field of Classification Search ................. 280/483, 280/484, 485, 486, 439, 901
See application file for complete search history.

(56) References Cited

U.S. PATENT DOCUMENTS 3,380,758 A 4/1968 Granning
4,302,004 A 11/1981 Deem et al.
4,566,716 A * 1/1986 Modat ........................ 280/439
4,955,631 A * 9/1990 Meyer ..................... 280/438.1
5,226,675 A * 7/1993 Noah et al. ................. 280/439
5,240,270 A 8/1993 Colibert
5,310,204 A 5/1994 Bagley, Jr.
5,328,198 A * 7/1994 Adams ....................... 280/439
5,388,849 A 2/1995 Arsenault et al.
5,513,869 A 5/1996 Putnam
5,639,106 A 6/1997 Vitale et al.
5,785,341 A 7/1998 Fenton
6,024,372 A 2/2000 Colibert et al.
6,135,482 A 10/2000 Larkin
6,170,849 B1 * 1/2001 McCall ....................... 280/433
6,416,073 B1 7/2002 Marcy
6,581,951 B2 * 6/2003 Lange ........................ 280/440
6,746,037 B1 6/2004 Kaplenski et al.
6,776,431 B1 8/2004 Dick
6,824,157 B1 11/2004 Putnam
6,908,093 B1 6/2005 Putnam
6,957,823 B1 * 10/2005 Allen ......................... 280/439
6,971,660 B1 12/2005 Putnam
7,222,872 B1 * 5/2007 Bauder ....................... 280/439
7,338,063 B2 * 3/2008 Graber ....................... 280/483
7,380,810 B1 * 6/2008 Wilkens et al. ............. 280/439
2004/0169348 A1 9/2004 Winckler

* cited by examiner

*Primary Examiner*—Lesley Morris
*Assistant Examiner*—Marlon A Arce
(74) *Attorney, Agent, or Firm*—Morriss O'Bryant Compagni, P.C.

(57) ABSTRACT

Fifth wheel hitch assemblies and fifth wheel hitch adaptors for dampening differential motion between a fifth wheel trailer and a tow vehicle. An upper assembly is formed as a box with an open bottom, and a lower assembly has front, rear, and side plates that extend into the open bottom of the upper assembly. Slide plates are disposed on the front and sides of the upper assembly facing at the front and side plates of the lower assembly. An additional slide plate is disposed on the rear plate of the lower assembly and faces the rear of the upper assembly. The lower assembly and upper assembly are attached to one another by an airspring and at least two diagonally opposed shock absorbers mounted therebetween. A locking mechanism may be included to prevent overextension between the upper assembly and lower assembly when not in use.

32 Claims, 12 Drawing Sheets

FIFTH WHEEL HITCH ASSEMBLY

TECHNICAL FIELD

The present invention relates generally to apparatuses for the coupling of towed vehicles to lead vehicles. More specifically, this invention relates to a fifth-wheel hitch assembly that provides improved towing conditions through the inclusion of motion compensating components, including a pneumatic airspring.

BACKGROUND

Fifth-wheel trailers are generally large, high profile trailers. They are typically coupled to a lead vehicle, such as a pick-up or flat-bed truck, by a fifth-wheel connector assembly mounted on a frame within the bed of the truck so that the fifth-wheel connector is disposed in a plane above that of the bed of the truck. Most such couplers are secured to the bed of the truck. Such permanent attachment of the coupler is problematic when the truck bed is needed for other purposes, such as cargo loading or camper carrying. A typical coupled hitch is not desirable since the connector assembly and frame usually take up a significant amount of space. Moreover, the removal of the assembly and frame from the truck bed typically requires an inordinate amount of time and effort.

Previous efforts to provide a mechanism for coupling allow a fifth wheel to be attached to a ball-hitch, such as a gooseneck hitch disposed at the rear of a tow vehicle, or in the bed of a pick-up or flat-bed truck, in order to avoid the use of a fifth wheel hitch utilizing a significant amount of space in the bed of the tow vehicle. Examples of such adaptors include those disclosed in U.S. Pat. Nos. 5,240,740, 6,024,372, 6,416,073 and 6,776,431, the disclosures of which are incorporated by reference herein. Typically, each of these devices consists of a top structure for connecting to a fifth wheel trailer, a frame extending downwards from the top structure, and a bottom structure for attaching to a ball hitch. While the frames may have a height adjustment, since they are simply metal boxes, these adaptors do not compensate for load conditions or road conditions, which can create discomfort for the driver and passenger when towing and place unnecessary wear and tear on the components.

U.S. Pat. No. 5,785,341, which is incorporated by reference herein, discloses a pneumatic isolator for use in attaching a trailer to a tow vehicle. An airspring is vertically mounted atop a tube extending down to the attachment hitch. The airspring compensates for the up and down motion of the trailer and tow vehicle as the tube slides in an outer tube. A single external shock absorber is used to connect the inner tube to the outer tube and to compensate for the reverse motion of the airspring. Although this design compensates for up and down motion, it does not adequately compensate for forward, reverse or lateral forces acting on the hitch during towing. It also requires permanent attachment to the fifth wheel trailer, preventing the fifth wheel trailer from being used with a standard fifth wheel hitch.

As such, an improved fifth-wheel hitch adaptor that enables a fifth wheel trailer to be attached to a retractable kingpin located in the bed of a tow vehicle (or attached to a hidden coupler mounted under the tow vehicle bed) and that compensates for forces from multiple directions during towing would be an improvement in the art. Such an adaptor that was releasably attachable would be a further improvement in the art.

SUMMARY

In one embodiment, the present invention includes a fifth wheel hitch assembly with motion isolation characteristics for dampening differential motion between a fifth wheel trailer and a tow vehicle. An upper assembly may be formed as a box with an open bottom that is attached to a trailer. A lower assembly that has front, rear and side plates that extend into the open bottom of the upper assembly and may be attached to a tow vehicle. Slide plates are disposed on the front and sides of the upper assembly facing the front and side plates of the lower assembly. An additional slide plate is disposed on the rear plate of the lower assembly and faces the rear of the upper assembly. In one embodiment, the lower assembly and upper assembly are attached to one another by an airspring and at least two diagonally opposed shock absorbers mounted therebetween. A locking mechanism may be included to prevent overextension between the upper assembly and lower assembly when not in use. Other embodiments include fifth wheel hitch adaptors.

DESCRIPTION OF THE DRAWINGS

It will be appreciated by those of ordinary skill in the art that the elements depicted in the various drawings are not to scale, but are for illustrative purposes only. The nature of the present invention, as well as other embodiments of the present invention may be more clearly understood by reference to the following detailed description of the invention, to the appended claims, and to the several drawings attached hereto.

DETAILED DESCRIPTION

It will be appreciated that the embodiments described herein, while illustrative, are not intended to so limit the invention or the scope of the appended claims. Those of ordinary skill in the art will understand that various combinations or modifications of the embodiments presented herein may be made without departing from the scope of the present invention.

Figure 1A:
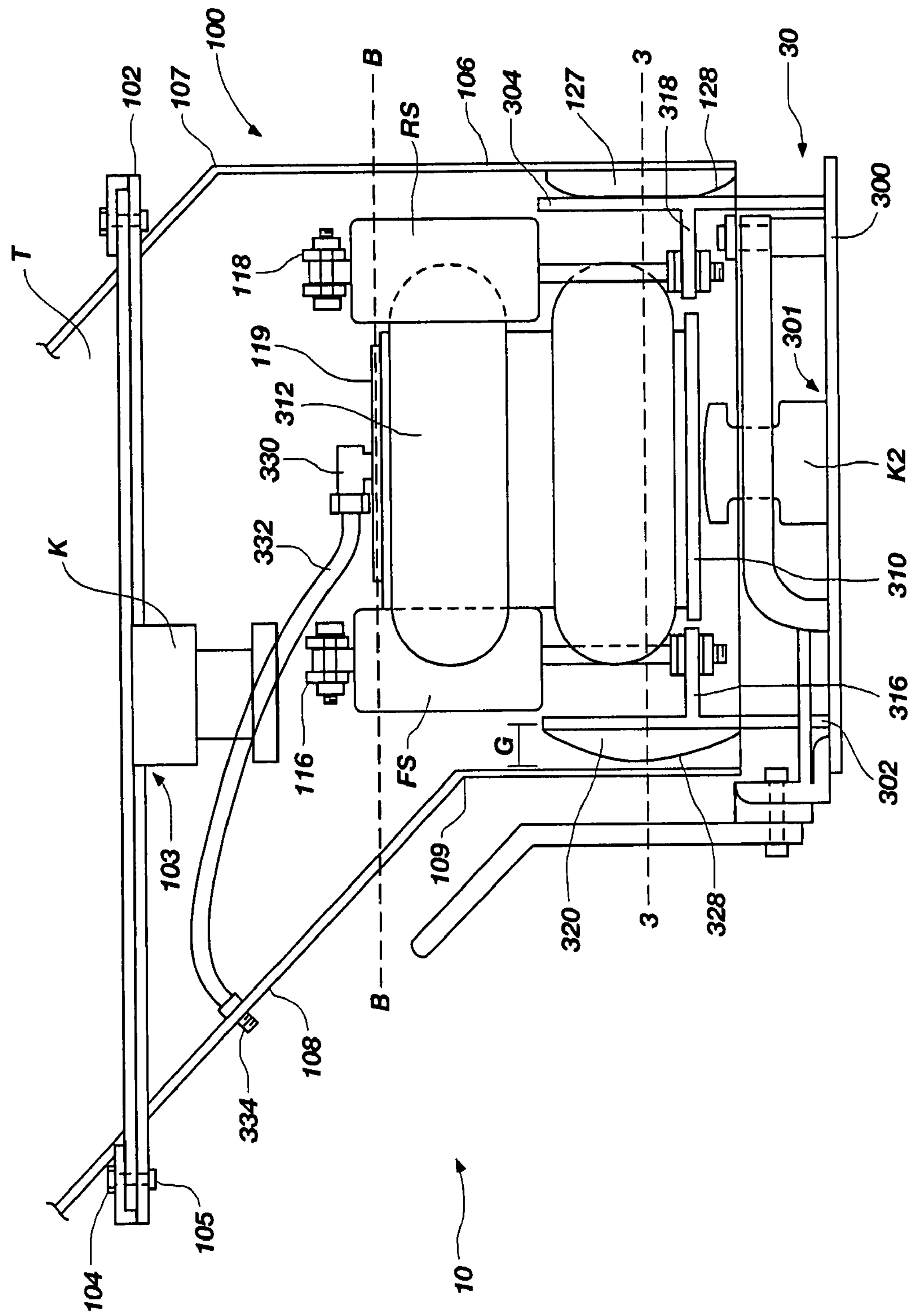
FIG. 1A is cutaway side view of one illustrative embodiment of a fifth wheel hitch assembly in accordance with the present invention.
Figure 1B:
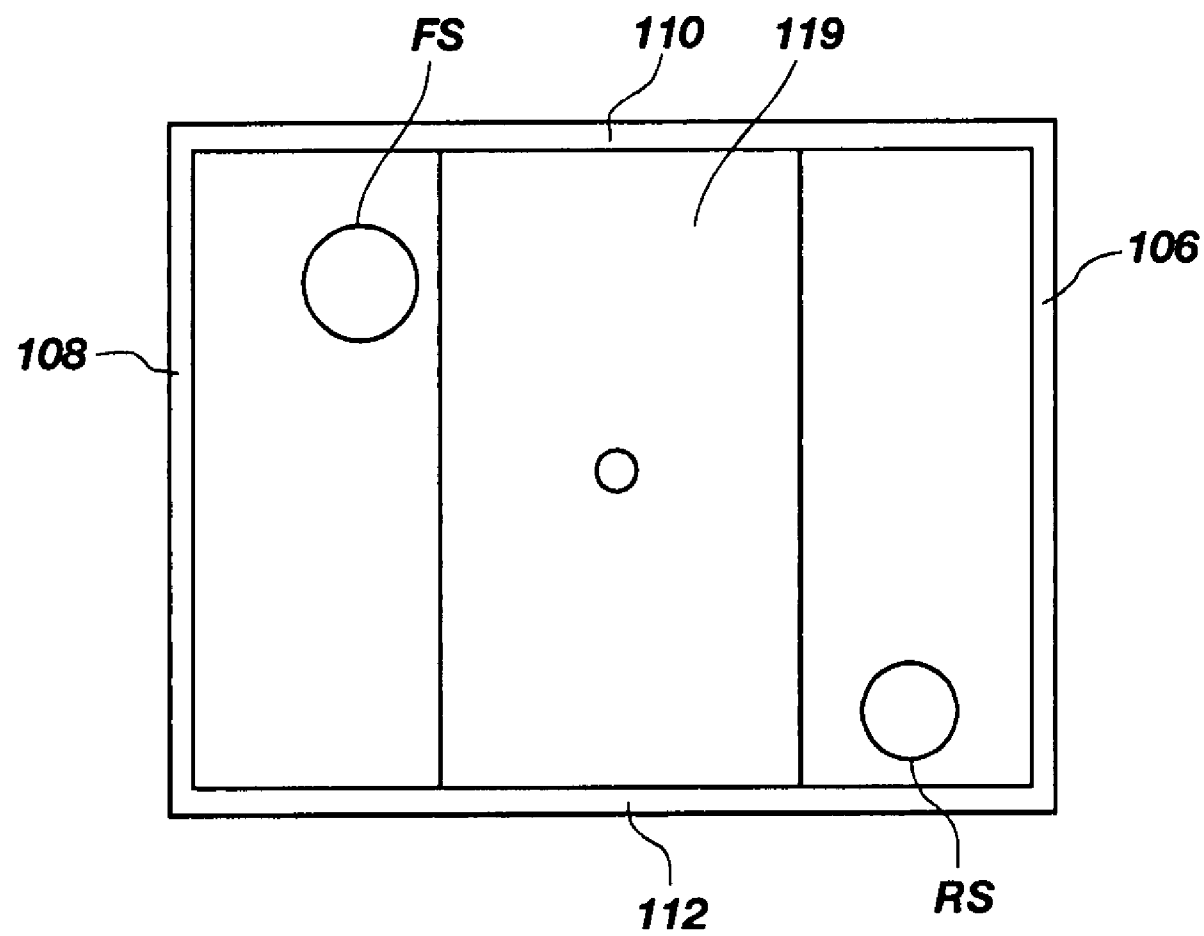
FIG. 1B is a sectional top view of the embodiment of FIG. 1A, taken along the line B-B.

Referring now to FIGS. 1A and 1B, an embodiment of a fifth wheel hitch assembly 10, in accordance with the principles of the present invention is depicted. Assembly 10 includes an upper assembly 100 and a lower assembly 30. Upper assembly 100 may be formed as a framework or as an enclosed box with an open bottom. In one embodiment, upper assembly 100 may include a top plate 102, which can be placed adjacent to a standard fifth-wheel trailer kingpin box T. Kingpin K of the fifth-wheel trailer kingpin box T may pass through an opening 103 in top plate 102. Upper assembly 100 may be secured to trailer kingpin box T by securing fasteners, such as bolts 104 and nuts 105 through aligned openings in the top plate 102 and the kingpin box T.

Where upper assembly 100 is formed as an enclosed box, a rear wall 108 extends down from top plate 102 near a rear edge thereof. As depicted, the upper assembly 100 may extend at a frontward angle before bending to descend in a more perpendicular fashion. In embodiments that include such a bend in upper assembly, rear wall 108 may include a bend 109 as part of such a shape. Rear wall 108 may be formed from two separate plates joined at bend 109 by a seam, such as a weld, or be attached to a metal framework having such a shape as a covering. Rear wall 108 extends downwards to the open bottom of upper assembly 100.

Front wall 106 extends down from top plate 102 near a front edge thereof. In embodiments that include a bend in upper assembly, front wall 106 may include a bend 107 corresponding to bend 109 in rear wall 108. Front wall 106 may be formed from two separate plates joined at bend 107 by a seam, such as a weld, or be attached to a metal framework having such a shape as a covering. Front wall 106 extends downwards to the open bottom of upper assembly 100.

Adjacent to the open bottom of upper assembly 100, a front slide plate 127 is positioned on the inner surface of front wall 106. Front slide plate 127 may have a generally planar back surface, which may be attached to front wall 106. The exposed front surface 128 of front slide plate 127 will have a generally convex cross-sectional shape, sloping from a relatively thicker midsection to relatively thinner upper and lower edges. Front slide plate 127 may be constructed from a high-density polymer, such a polyethylene, or from any other material known to those of skill in the art to have a high durability and a fairly low coefficient of friction.

Two side walls 110 and 112 (FIG. 1B) may extend downwards from top plate 102 near the opposite side edges thereof to the open bottom of upper assembly 100. Each side wall 110 or 112 may extend from front wall 106 to rear wall 108 and be attached thereto by a seam, such as a weld. Where upper assembly 100 includes an internal framework, the side walls 110 and 112 may be attached to the framework. It will be appreciated that walls 106, 108, 110 and 112 of upper assembly may also be formed from larger pieces that are bent and cut to the desired shapes rather than from individual metal plates that are welded together.

Adjacent to the open bottom of upper assembly 100, side slide plates 120 and 122 are positioned on the inner surfaces of side walls 110 and 112, respectively (FIG. 1B). Similar to front slide plate 127, the exposed front surfaces 121 of each side slide plate 120 or 122 will have a generally convex cross-sectional shape, sloping from a relatively thicker midsection to relatively thinner upper and lower edges. Each side slide plate 120 or 122 may be constructed from a high-density polymer, such a polyethylene, or from any other material known to those of skill in the art to have a high durability and a fairly low coefficient of friction.

An upper attachment plate 119 may be provided in upper assembly 100 to allow an airspring 312 (discussed in detail further herein) to be attached thereto. Additionally, two or more upper mounts 116 and 118 for the attachment of shock absorbers FS and RS may be present. These structures will be discussed in detail further herein.

Figure 2A:
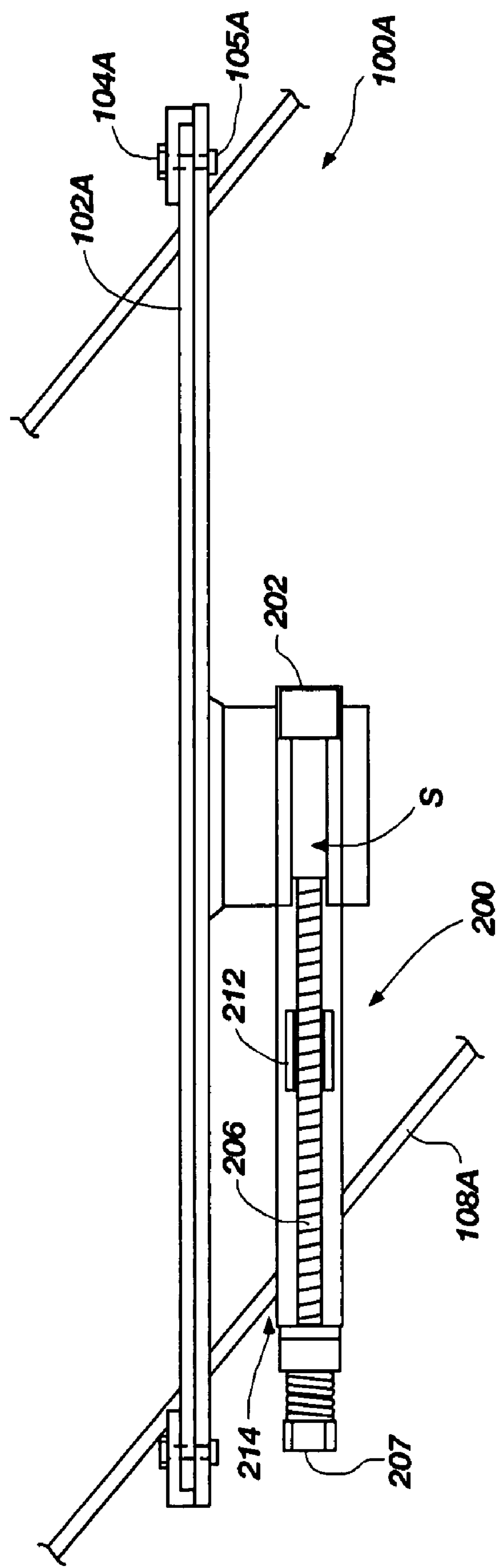
FIG. 2A is a cutaway side view of a portion of a second illustrative embodiment of a second fifth wheel hitch assembly in accordance with the present invention.
Figure 2B:
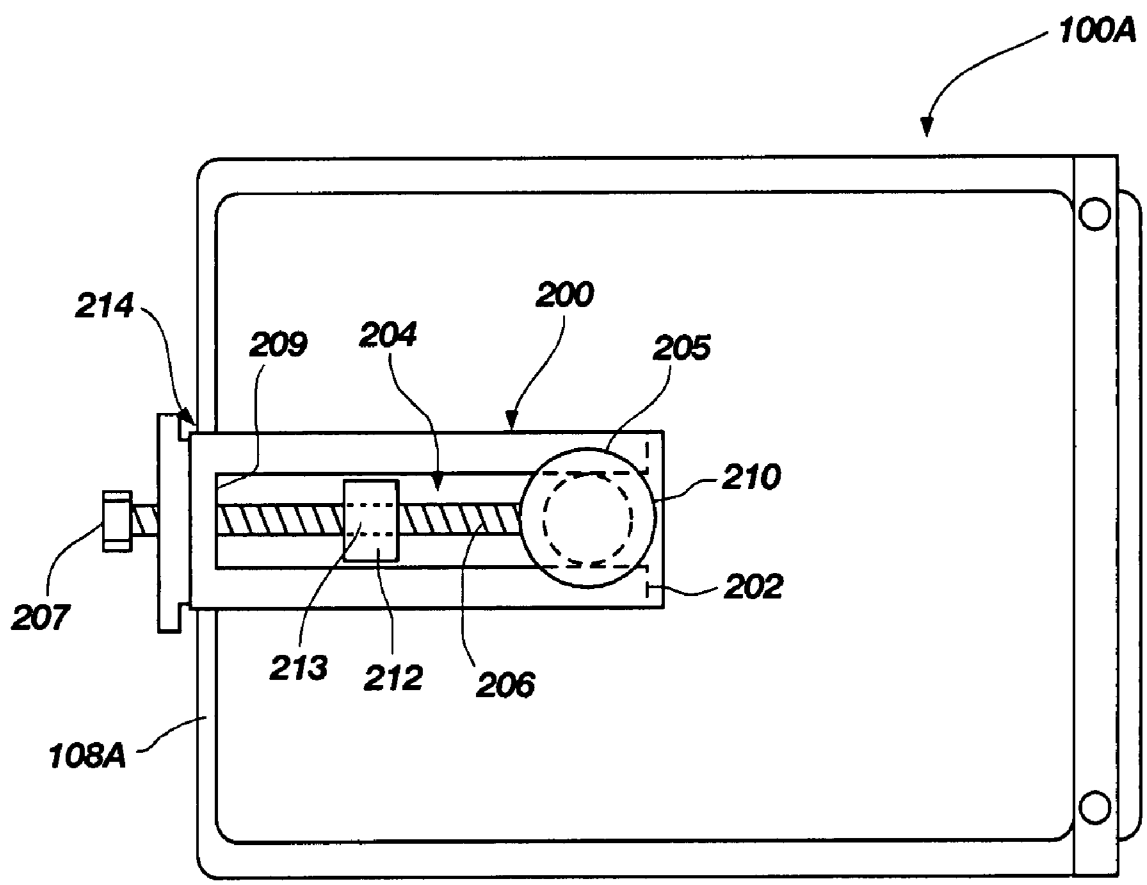
FIG. 2B is a sectional view of the embodiment of FIG. 2A, taken along the line A-A of FIG. 2A.

FIGS. 2A and 2B depict a kingpin retainer 200 disposed in the upper assembly 100A. These additional structures may allow an upper assembly 100A to be attached to a standard fifth-wheel trailer kingpin box T. This may be in addition to, or in lieu of, fasteners such as bolts 104A and nuts 105A which are secured in aligned openings in the top plate 102A and the kingpin box T.

Kingpin retainer 200 includes a body 202, which may be formed as a metal block. Body 202 passes through rear wall 108A via passage 214 and into the interior of upper assembly 10A. Body 200 may be secured to an internal metal framework, where present. Body 202 may be formed as a rectangular body having a planar top, bottom and sides. A slot 204 passes through the center of body 202 from a front wall 209 and may include an enlarged rear portion 205 adjacent to end wall 210 for allowing a kingpin K of a fifth-wheel trailer kingpin box T to pass therethrough. The sidewalls of slot 204 may be planar, or may include insets which receive sliding lock block 212 therein. A threaded shaft 206 passes through an opening in front wall 210, such that a proximal end 207 thereof is disposed outside rear wall 108A. The distal portion of threaded shaft 206 extends through slot 204 with the distal end thereof disposed at or near enlarged portion 205. Threaded shaft 206 threadably engages sliding block 212, extending through a threaded passage 213 therein, such that rotation of the threaded shaft 206 causes sliding block 212 to move in a proximal or distal direction along slot 204. Proximal end 207 of threaded shaft 206 may be configured to facilitate rotation of the threaded shaft, by having a square or polygonal cross section in order to receive a wrench or other turning device, or may be shaped as a handle.

In use, upper assembly 100A may be secured to a trailer by passing kingpin K of a fifth wheel hitch into the enlarged rear portion 205 of slot 204 in body 202, which may include passing the kingpin through an opening in upper plate 102A. Threaded shaft 206 is rotated to move slidable block 212 against a slot S in kingpin K. Shaft 206 may be turned until kingpin K is secured in body 202 by block 212, joining trailer T to assembly 100A. To release kingpin K, rotation of shaft 206 is reversed, causing block 212 to move away from kingpin K.

Figure 2C:
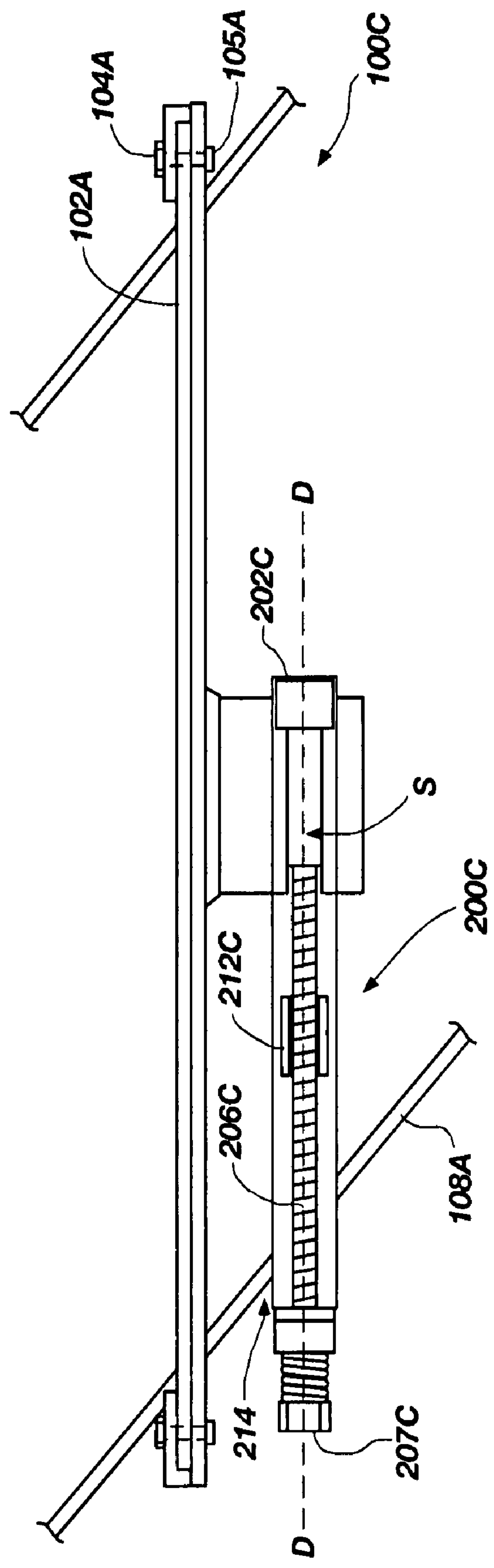
FIG. 2C is a cutaway side view of a portion of another illustrative embodiment of a fifth wheel hitch assembly in accordance with the present invention.
Figure 2D:
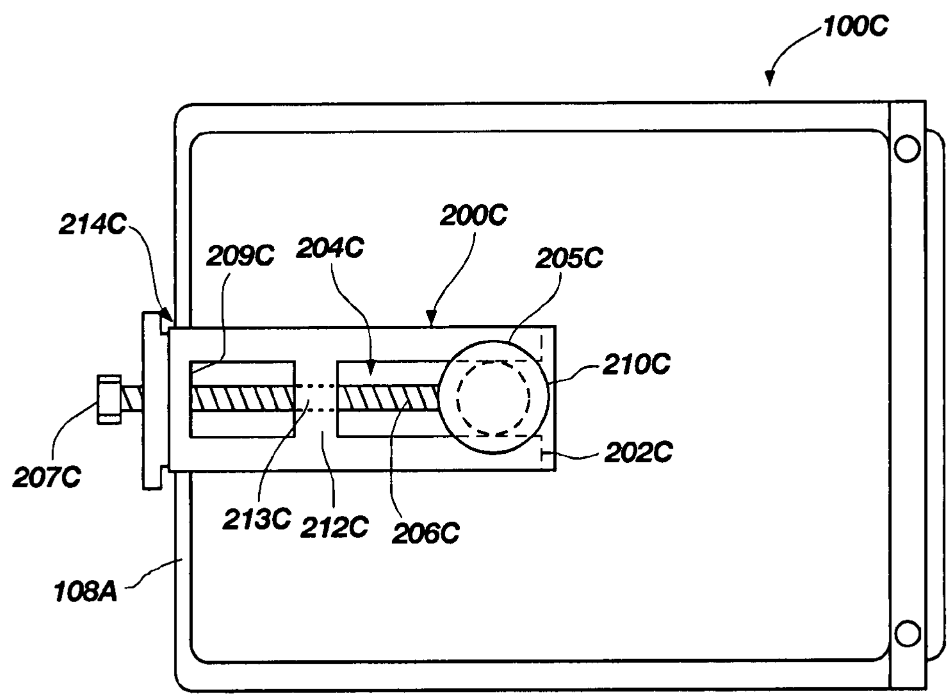
FIG. 2D is a sectional view of the embodiment of FIG. 2A, taken along the line D-DA of FIG. 2A.

FIGS. 2C and 2D depict a second kingpin retainer 200C disposed in the upper assembly 100C. These additional structures may allow an upper assembly 100C to be attached to a standard fifth-wheel trailer kingpin box T. This may be in addition to, or in lieu of, fasteners such as bolts 104A and nuts 105A which are secured in aligned openings in the top plate 102A and the kingpin box T.

Kingpin retainer 200C includes a body 202C, which may be formed as a metal block. Body 202 passes through rear wall 108C via passage 214C and into the interior of upper assembly 100C. Body 200C may be secured to an internal metal framework, where present. Body 202C may be formed as a rectangular body having a planar top, bottom and sides. A slot 204C passes through the center of body 202C from a front wall 209C and may include an enlarged rear portion 205C adjacent to end wall 210C for allowing a kingpin K of a fifth-wheel trailer kingpin box T to pass therethrough. The sidewalls of slot 204C may be planar. A threaded shaft 206C passes through an opening in front wall 210C, such that a proximal end 207C thereof is disposed outside rear wall 108C. A keeper 207C is attached at the proximal end of shaft 206C and may allow for its rotation. The distal portion of threaded shaft 206C extends through slot 204C with the distal end thereof directed towards enlarged portion 205C. Threaded shaft 206C threadably engages a fixed block 212C, extending through a threaded passage 213C therein, such that rotation of the threaded shaft 206C causes the distal end thereof to move in a proximal or distal direction along slot 204C fixed block 212C may be attached to body 202C or to a framework inside upper assembly 100C.

In use, upper assembly 100C may be secured to a trailer by passing kingpin K of a fifth wheel hitch into the enlarged rear portion 205C of slot 204C in body 202C, which may include passing the kingpin through an opening in upper plate 102C. Threaded shaft 206C is rotated to move against a slot S in kingpin K. Shaft 206C may be turned until kingpin K is secured in body 202C. To release kingpin K, rotation of shaft 206C is reversed.

Of course, it will be appreciated that in some embodiments, the upper assembly 100 may be directly connected to a trailer frame, eliminating the need for connection structures therebetween. For example, FIGS. 3B and 3C depict embodiments where the upper assembly is attached directly to a trailer frame F. It will be appreciated that in each of these embodiment, the upper assembly is shorter, allowing the kingpin K3 disposed on the bottom surface of the hitch assemblies to be mounted to a standard fifth wheel hitch disposed ion the bed of a truck, as will be explained further herein.

Figure 3A:
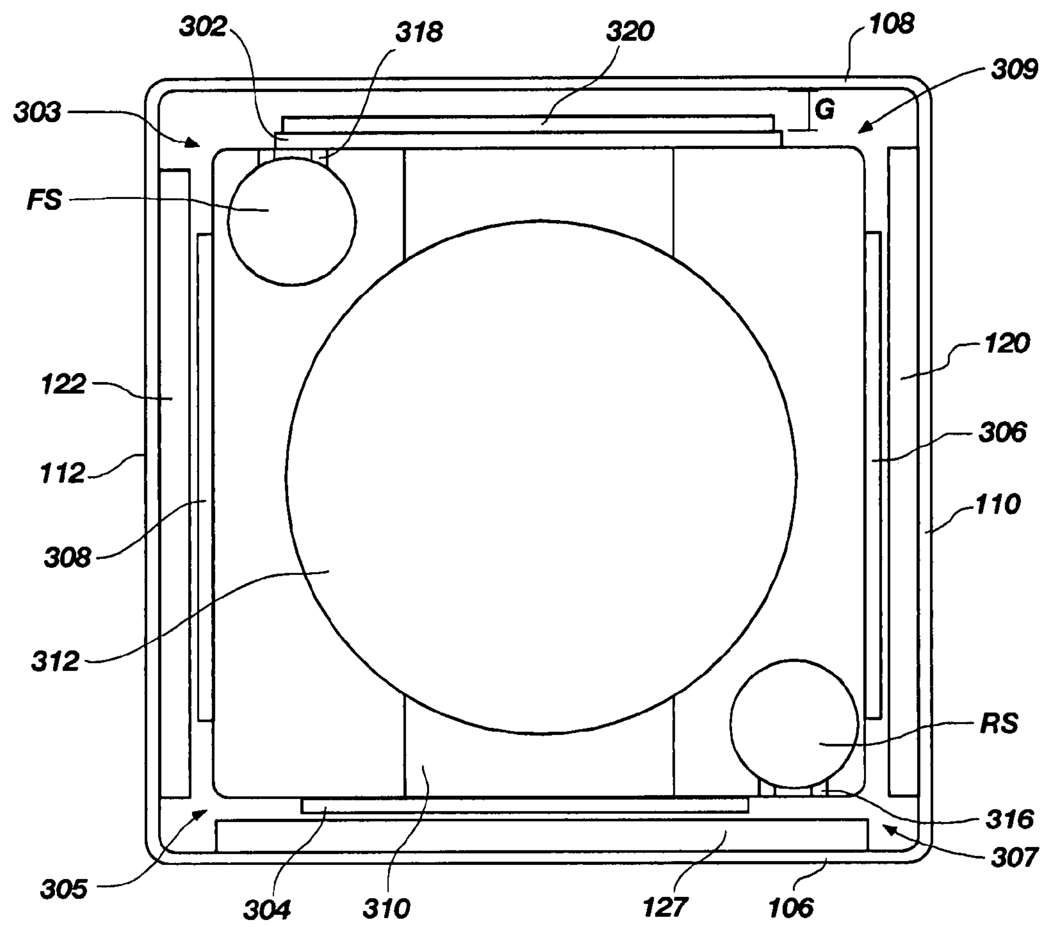
FIG. 3A sectional top view of the embodiment of FIG. 1A, taken along the line 3-3.
Figure 3B:
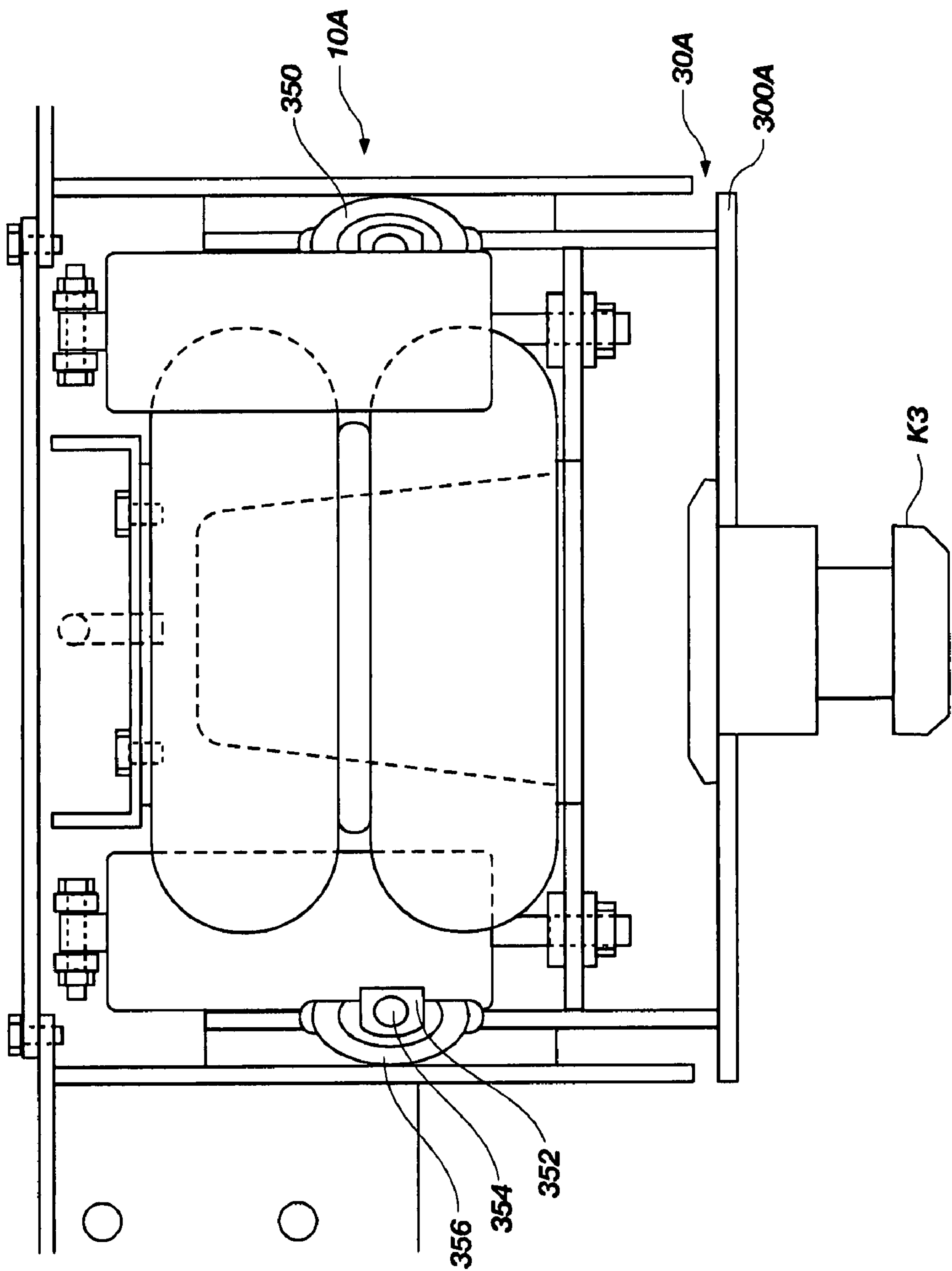
FIG. 3B is a sectional front view of another embodiment of a fifth wheel hitch assembly in accordance with the principles of the present invention.
Figure 3C:
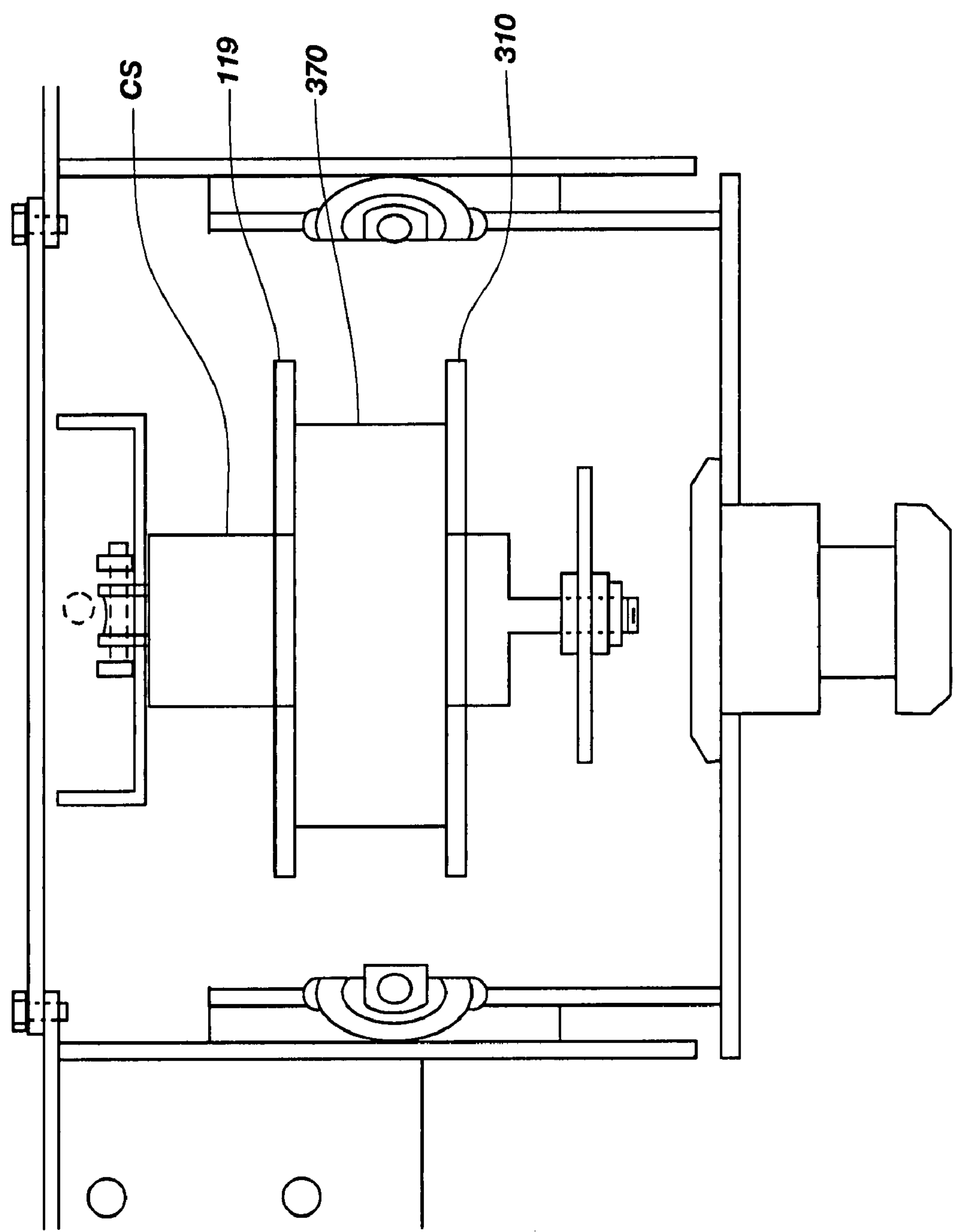
FIG. 3C is a sectional front view of another embodiment of a hitch assembly in accordance with the principles of the present invention.

Returning to FIG. 1A, and also referring to FIG. 3A, the depicted embodiment of a fifth wheel hitch assembly 10 includes a lower assembly 30. Lower assembly 30 includes a lower plate 300. Lower plate 300 may be formed of metal and include an opening 301 through which a kingpin K2 may be inserted. Kingpin K2 may be a retractable kingpin disposed in the bed of a pick-up or flat-bed truck, may be disposed on a fifth wheel hitch adaptor in the bed of a tow vehicle, or may be disposed at the rear of a tow vehicle, on a ball hitch. Lower plate 300 may have a generally square or rectangular space with smooth upper and lower surfaces.

A rear plate 302 is attached near the rear edge of lower plate 300 and extends upwards in a perpendicular fashion therefrom. Rear plate 302 may be formed from metal and attached to lower plate 300 by welding. Rear plate 302 extends into the open bottom of upper assembly 100 behind rear wall 108. A rear gap G is formed between rear wall 108 and rear plate 302.

A rear slide plate 320 is positioned on the rear surface of rear plate 302, at least partially within gap G. Rear slide plate 320 may have a back surface adjacent rear plate 302, to which it is attached. The exposed front surface 328 of rear slide plate 320 has a generally convex cross-sectional shape, sloping from a relatively thicker midsection to relatively thinner upper and lower edges. Front surface 328 faces the rear surface of rear wall 108. As with front slide plate 127 and side slide plates 120 and 122, rear slide plate 320 may be constructed from a high-density polymer, such a polyethylene, or from any other material known to those of skill in the art to have a high durability and a fairly low coefficient of friction.

A front plate 304 is attached near the front edge of lower plate 300 and extends upwards therefrom. Front plate 304 extends into the open bottom of upper assembly 100 behind front wall 106. A gap is formed between front plate 304 and front wall 106, such that front slide plate 127 at least partially is contained therein. In contrast to rear plate 302, front plate 304 does not extend upwards in a generally perpendicular fashion, but slopes inwards away from front wall 106. This may be accomplished by having front plate 304 extend perpendicularly upwards for an initial segment, then taper inwards toward its distal end. Front plate 304 may be formed from metal and attached to lower plate 300 by welding.

Two side plates 306 and 308 are attached near each side edge of lower plate 300 and extend upwards therefrom. Each side plate 306 or 308 extends into the open bottom of upper assembly 100 inside and adjacent to a respective side wall 110 or 112. A gap is formed between each side plate and its adjacent side wall, such that a side slide plate 120 or 122 at least partially is disposed therein. Similar to front plate 304, each side plate 306 or 308 may slope inwards away from the adjacent side wall 110 or 112 as it extends upward. Each side plate 306 and 308 may be formed from metal and attached to lower plate 300 by welding.

Open corner spaces 303, 305, 307 and 309 are formed above lower plate 300 by the edges of front plate 304, side plates 306 and 308 and rear plate 302. In some embodiments, open corner spaces 303, 305, 307 and 309 can reduce potential binding of the assembly 10 during use. In other embodiments, the movement of the upper assembly 100 and lower assembly 30 may be facilitated by the placement of a wheel assembly 50 in each of the open corner spaces, as will be discussed further herein with FIG. 3B.

Referring to FIG. 3B, there is depicted a sectional view of another embodiment of a fifth wheel hitch assembly 10A includes a lower assembly 30A. Lower assembly 30A includes a lower plate 300A. Extending from lower plate 300A is a kingpin K3. Kingpin K3 may be used to couple the assembly 10A to a fifth wheel hitch adaptor in the bed of a tow vehicle.

Additionally, lower assembly 30A includes four wheel assemblies 50, placed in each of the open corner spaces. Each wheel assembly 50 may consist of a wheel mount 352. Wheel mount 352 may be used to attach the wheel assembly 50 to lower plate 300A, or may be used to attach the wheel assembly 50 in the corner space between the side plate and the front or rear plate (depending on the corner). An axle 354 may be attached to wheel mount 352. Wheel 356 rotates around axle 354, and may include a bearing assembly for smoother operation. For example, each wheel may be a sealed bearing wheel. Wheel 356 may be formed from a high-density polymer, such a polyethylene, or from any other material known to those of skill in the art to have a high durability and a fairly low coefficient of friction. The surface of wheel 356 may be in contact with the interior of the corresponding corner of upper assembly 100A and facilitate movement of the upper and lower assemblies 100A and 30A with respect to one another.

Returning to FIGS. 1A and 3A, a lower attachment plate 310 may be provided in lower assembly 30 to allow an airspring 312 (discussed in detail further herein) to be attached thereto. Lower attachment plate 310 may be formed as a plate extending from side plate 308 to side plate 306, or from front plate 304 to rear plate 302, or both. Additionally, two or more lower mounts 316 and 318 for the attachment of shock absorbers FS and RS may be present. These structures will be discussed in detail further herein.

Upper assembly 100 is attached to lower assembly 30 by motion compensating structures. Airspring 312 is secured to upper attachment plate 119 and to lower attachment plate 310, and in use compensates for the independent motion of forces on the tow vehicle and the trailer by absorbing forces and allowing upper assembly 100 and lower assembly 30 to move with respect to one another.

Airspring 312 may be an airbag designed for use as a spring in automotive, train, tractor-trailer, and other vehicular suspension systems. Typically airsprings may include a bellows attached to one or more plates. Physical connections may be made to the plates or the pistons of the airbags through connection bolts disposed therein (to secure airspring 312 to upper and lower attachment plates 119 and 310). Currently, airsprings are available in reversible sleeve (piston) and single, double or triple convoluted conformations, any of which may be used with embodiments of the present invention. Suitable airsprings are available from FIRESTONE and other suspension component manufacturers. These may be used in the present invention as well.

It will be appreciated that airspring 312 may be considered a pneumatic spring configured as a column of gas (air) confined within a container. The pressure of the confined gas, and not the structure of the container, acts as the force medium of the spring. A wide variety of sizes and configurations of airsprings are available, including sleeve-type airsprings, bellows-type airsprings, convoluted-type airsprings, rolling lobe airsprings, etc. Such airsprings are commonly used in both vehicular and industrial applications. Airsprings, regardless of their size and configuration, share many common elements. In general, an airspring includes a flexible, sleeve-like member made of fabric-reinforced rubber that defines the sidewall of an inflatable container. Each end of the flexible member is closed by an enclosure element, such as a bead plate that is attached to the flexible member by crimping. The uppermost enclosure element typically also includes air supply components and mounting elements (e.g., studs, blind nuts, brackets, pins, etc.) to couple the airspring to a desired structure. The lowermost enclosure element also typically includes mounting elements to couple the airspring to a desired structure. Examples of airsprings are set forth and discussed in U.S. Pat. No. 6,957,806, the disclosure of which is incorporated by reference herein.

As depicted in FIG. 1A, airspring 312 includes a fitting 330 to which an air hose 332 and a valve 334 may be functionally attached. These structures may be used to inflate and deflate airspring 312. Valve 334 may include an exhaust, or a separate exhaust may be included for deflation of airspring 312. Valve 334 may be attached to a gas source, such as an air compressor or a tank holding compressed air. In some embodiments, valve 334 may be a standard needle valve, such as that used on automobile tires and the gas source may be an air compressor or other air pump that is temporarily connected to valve 334 for adjustment of the pressure in airspring 312.

Shock absorbers FS and RS are conventional dampening shock absorbers mounted between upper mounts 116 and 118 of upper assembly 100 and lower mounts 316 and 318 of lower assembly 30. Each of the upper and lower mounts may be formed as a set of mounting ears, each of which includes an aperture. A pin may be extended through the apertures in each of the ears and through a portion of shock absorber FS or RS.

As depicted, shock absorbers FS and RS are disposed on diagonally opposite corners of upper and lower assemblies 100 and 30. In some embodiments, two shock absorbers may be used, disposed in such a diagonally opposite arrangement. In other embodiments, four shock absorbers may be used, one disposed near each of the four corners of the assemblies.

Turning to FIG. 3C, an alternative motion compensating structure is depicted in a hitch assembly 10B. In place of an airspring 312 and opposite shock absorbers FS and RS, a single central resilient member 370 is secured to upper attachment plate 119 and to lower attachment plate 310, and in use compensates for the independent motion of forces on the tow vehicle and the trailer by absorbing forces and allowing upper assembly 100 and lower assembly 30 to move with respect to one another. Resilient member 30 may be a rubber bushing or a coil spring having sufficient resiliency to absorb the forces placed upon it infuse.

A single central shock absorber CS may be mounted between the upper assembly 100 and lower assembly 30, and be disposed through a central aperture in the resilient member 370. Central chock absorber CS may be a conventional dampening shock absorber.

Figure 4:
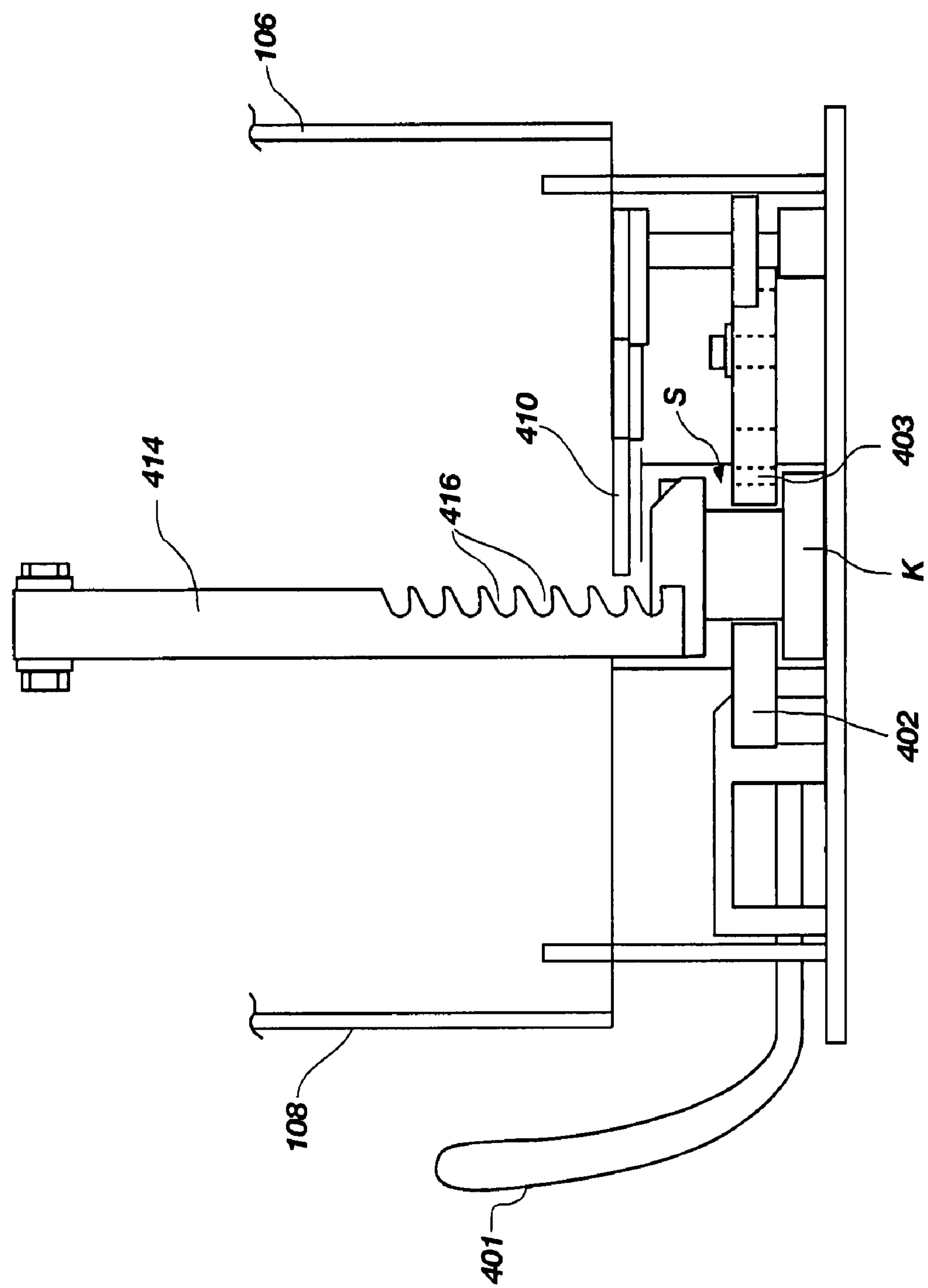
FIG. 4 is a side view of the embodiment of the components of a locking and attachment mechanism for the embodiment of FIG. 1A.
Figure 5:
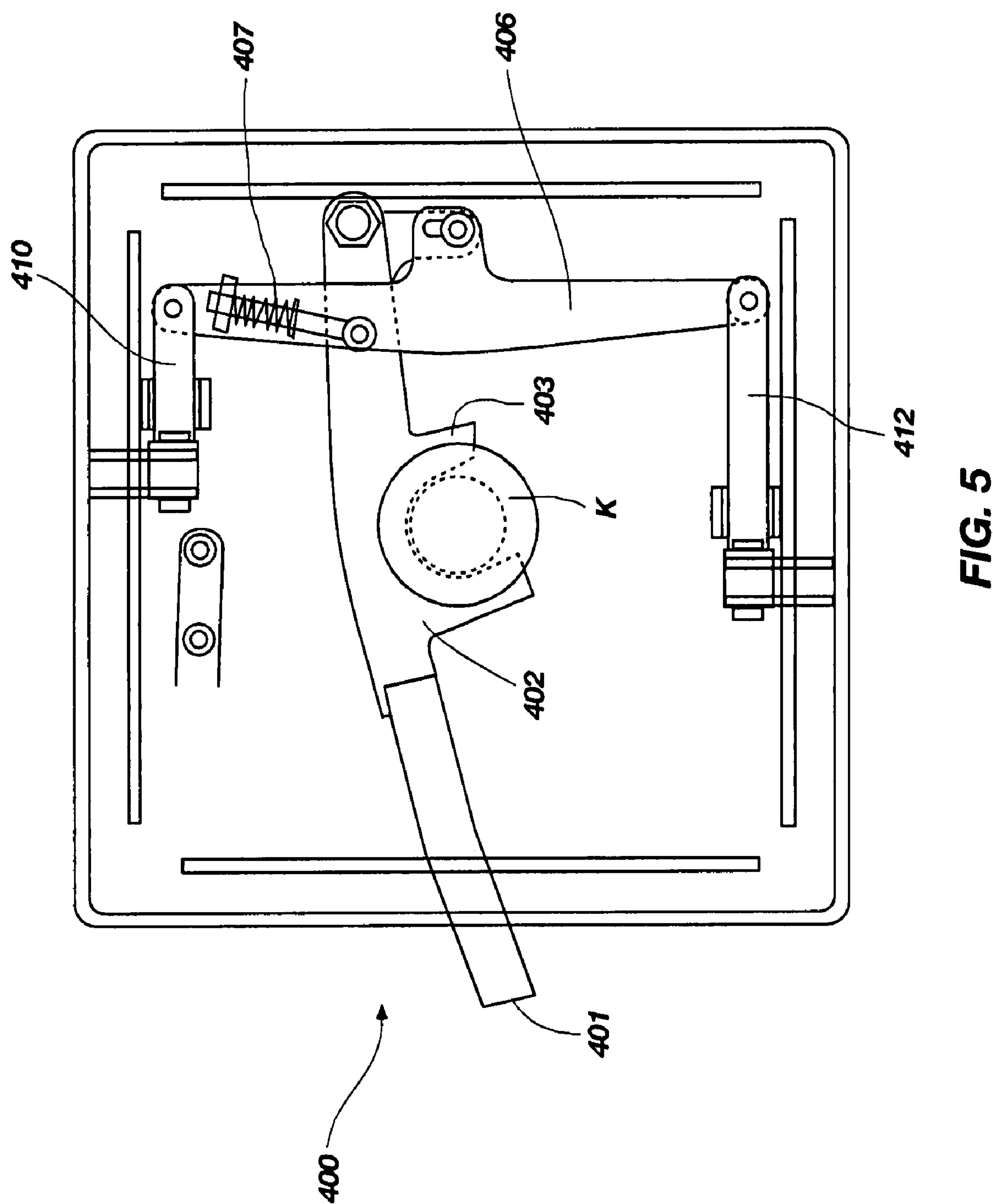
FIG. 5 is a bottom view of the mechanism of FIG. 4.

Turning to FIGS. 4 and 5, a locking mechanism 400 for attaching the lower assembly 30 to a kingpin K disposed in the bed of a pick-up or other tow vehicle is depicted. Also depicted is a counterpart mechanism for preventing the over-extension of the fifth wheel hitch assembly 10, due to pressure in airspring 312 during attachment and detachment of the assembly 10 to a tow vehicle. A number of the components of assembly 10 are omitted from these figures to allow the components of the locking mechanism to be more clearly understood.

Locking mechanism 400 includes a kingpin arm 402 formed as an elongated member having a proximal end terminating in handle 401 that may include a locking device, such as a cotter pin, to prevent inadvertent detachment from a kingpin K. Kingpin arm 402 also includes a kingpin saddle 403, formed as an arc-shaped section that engages a slot S of a kingpin K. A distal end of kingpin arm 402 is attached to lower assembly 30. Kingpin arm 402 may be pivotally manipulated with respect to the distal end, to move kingpin saddle 403 in and out of contact with kingpin K. Return spring 407 acts to retain kingpin arm 402 in position against kingpin K, (when present) acting as a positive locking mechanism.

Two locking tabs 410 and 412, each disposed on an opposite side of lower assembly 30 are connected to linkage 406, such that locking tabs 410 and 412 move when the kingpin arm 402 is pivotally manipulated. It will be appreciated that although linkage 406 is depicted as several components between kingpin arm 402 and locking tabs 410 and 412, any suitable linkage known to those of ordinary skill in the art may be used, so long as the linkage is able to move locking tabs 410 and 412 as desired upon movement of the kingpin arm 402. It will also be appreciated that locking tabs 410 and 412 may be moved by a separate control, as by handles allowing the tabs to be slidably moved, without connection to kingpin arm 402 via a linkage system.

As best depicted in FIG. 4, a receiving member 414 is attached to a mount on upper assembly 100 and interacts with locking tab 410. Although not depicted in FIG. 4, a counterpart structure on the opposite side of hitch assembly 10 interacts with locking tab 412. Receiving member 414 includes an elongated body and a number of receiving shelves 416. Each of the receiving shelves 416 may be spaced apart along the vertical axis of the body of receiving member 414, facing towards locking tab 410. Prior to release of hitch assembly 10 from a lower kingpin K, locking tab 410 is slidably moved to engage a receiving shelf 416 on receiving member 414. The opposite locking tab 412 is similarly engaged with an opposite receiving member. Slidable movement of locking tabs 410 and 412 may be caused by linkage 406 or by actuation of other control handles attached to locking tabs 410 and 412. The distal end of locking tab 410 resides in the receiving shelf

416 and the upper surface thereof abuts against the shelf preventing lower assembly 30 from expanding downward away from upper assembly 100. As airspring 312 exerts a downward force from the gas contained therein, this prevents expansion of hitch assembly 10, to allow hitch assembly 10 to be removed from attachment to the tow vehicle.

Figure 6:
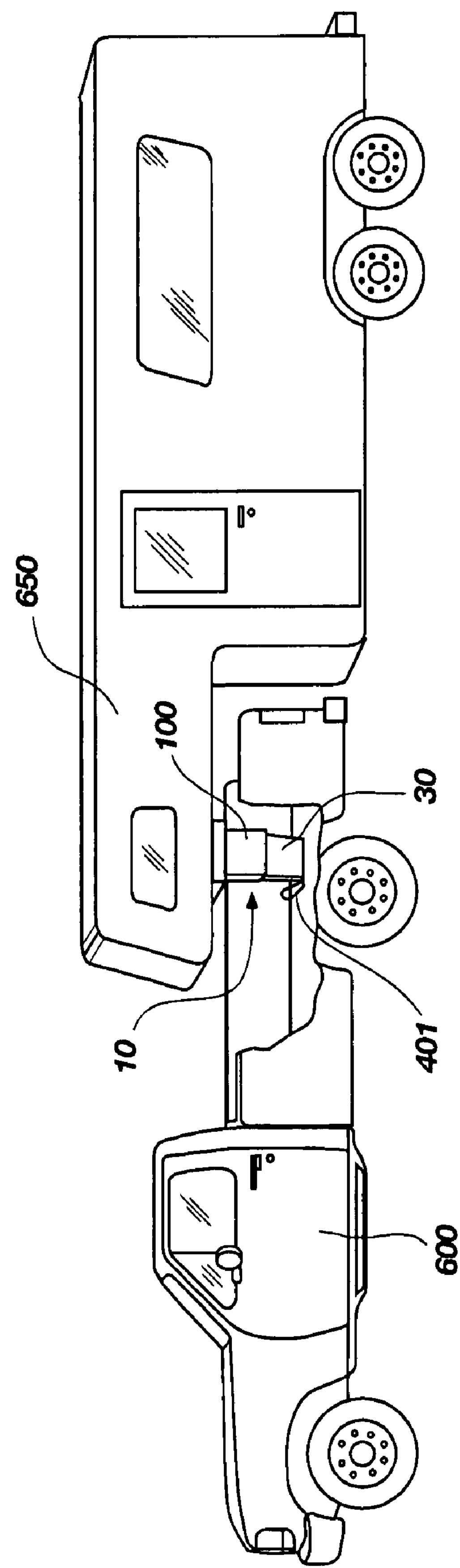
FIG. 6 is a side view depicting a truck attached to a fifth wheel trailer using a fifth wheel hitch assembly in accordance with the present invention.
Figure 7:
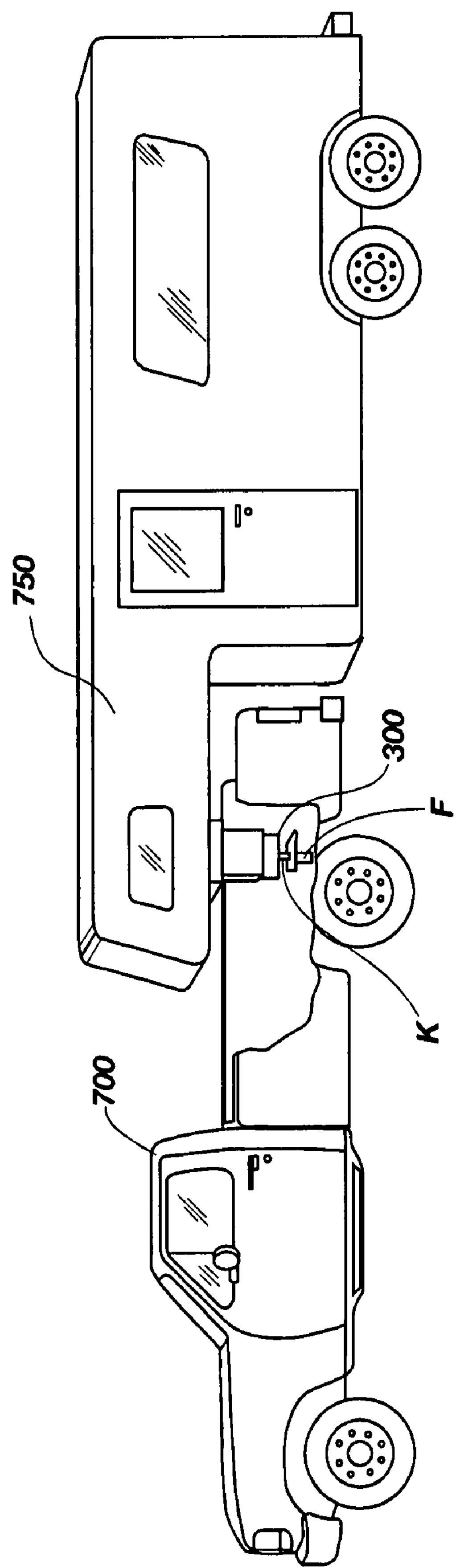
FIG. 7 is a side view depicting a truck attached to a fifth wheel trailer using another embodiment of a fifth wheel hitch assembly in accordance with the present invention.

FIG. 6 is a side view depicting a tow vehicle 600 attached to a fifth wheel trailer 650 using a fifth wheel hitch assembly 60 in accordance with the present invention. As depicted, tow vehicle 600 is a pick-up truck having a retractable kingpin or ball hitch mounted in the bed thereof. Upon towing trailer 650 to a desired location, the hitch assembly 10 is released and the kingpin or ball hitch may be retracted, allowing the bed of the truck to be used for other purposes. FIG. 7 depicts hitch assembly 70 being used to attach a fifth wheel trailer 750 to a tow vehicle 700 having a standard fifth wheel hitch mounted in the back thereof. For such an embodiment, the locking mechanism 400 may be removed from lower assembly 30 and a kingpin K is attached to lower plate 300, which is inserted into the fifth wheel hitch, as depicted in FIG. 3B. Alternatively, a double-headed kingpin may be inserted into a locking mechanism of the hitch assembly 70 and also into the fifth wheel hitch, allowing the use of an embodiment including the locking mechanism. This allows the motion compensating aspects of the present invention to be utilized with a standard fifth wheel set up.

In use, the hitch assemblies 10, 60, or 70 of the present invention compensation for different motions of a tow vehicle and a fifth wheel trailer. Upper assembly 100 and lower assembly 30 are able to move vertically with respect to one another as lower assembly 30 slides upwardly and downwardly within upper assembly 100, compressing and expanding airspring 312. Shock absorbers FS and RS dampen the travel of airspring 312. Additionally, diagonally opposed shock absorbers FS and RS compensate for lateral and front to rear pitching motions of the trailer. Lower assembly 30 and upper assembly 100 are able to adjust such lateral movement as the plates of lower assembly 30, and walls of upper assembly 100 are capable of angular adjustment with respect to one another. As such motion occurs, front plate 304 and side plates 306 and 308 are able to slip across the convex front surfaces of sliding plates 120, 122, and 127, and rear plate 302 is able to slip across rear wall 108 using the convex front surface of rear side plate 320. Similarly, each wheel 356 of the wheel assemblies 350 spins, facilitating the movement of upper assembly 100 in relation to lower assembly 30.

It has been found that curved tops of front plate 304 and side plates 306 and 308 facilitate this motion. Further, placement of rear slide plate 320 on rear plate 302 rather than rear wall 108 is preferred due to the rearward force typically acting across hitch assembly 10 during towing. This compensation for lateral motion may improve towing ride, and extend the life of the components, compared to other known devices, such as that disclosed in U.S. Pat. No. 6,024,372, the disclosure of which is incorporated by reference herein, which only compensate for motional differences in a single direction.

It will be appreciated by those of ordinary skill in the art that the embodiments described herein are not intended to limit the scope of the present invention. Various combinations and modifications of the embodiments described herein may be made without departing from the scope of the present invention, and all modifications are meant to be included within the scope of the present invention. Thus, while certain exemplary embodiments and details have been described for purposes of describing the invention, it will be apparent to those of ordinary skill in the art that various changes in the invention described herein may be made without departing from the scope of the present invention, which is defined in the appended claims.

What is claimed is:

1. A fifth wheel hitch assembly, comprising:

an upper assembly comprising a top structure configured for attachment to a fifth wheel trailer, and an upper box having an open bottom attached to the top structure, the box comprising a front wall, a rear wall, a first side wall, and a second side wall, a lower assembly comprising a lower box having a bottom structure configured for attachment to a connection structure disposed on a tow vehicle, a rear plate extending upwards from the bottom structure into the open bottom of the upper box, adjacent the rear wall, a front plate extending upwards from the bottom structure into the open bottom of the upper box, adjacent the front wall, a first side plate extending upwards from the bottom plate into the open bottom of the upper box, adjacent the first side wall, and a second side plate extending upwards from the bottom plate into the open bottom of the upper box, adjacent the second side wall;

a front slide plate disposed between an inner surface of the front wall and an outer surface of the front plate, a first side slide plate disposed between an inner surface of the first side wall and an outer surface of the first side plate, a second side slide plate disposed between an inner surface of the second side wall and an outer surface of the second side plate;

a rear slide plate disposed between an outer surface of the rear plate and an inner surface of the rear wall, said front, first second and rear slide plates facilitating sliding engagement between said upper box and said lower box, at least one resilient member disposed between the upper assembly and the lower assembly; and at least one shock absorber disposed between the upper assembly and the lower assembly.

2. The fifth wheel assembly of claim 1, wherein the at least one resilient member comprises an airspring.

3. The fifth wheel assembly of claim 2, wherein the at least one shock absorber comprises at least two shock absorbers disposed between the upper assembly and the lower assembly, the at least two of the at least two shock absorbers in a diagonally opposed relationship to one another.

4. The fifth wheel assembly of claim 1, wherein the at least one resilient member comprises a rubber bushing or a coil spring.

5. The fifth wheel assembly of claim 4, wherein the at least one shock absorber is disposed between the upper assembly and the lower assembly and at least partially within a central aperture of the rubber bushing or coil spring.

6. The fifth wheel assembly of claim 1, further comprising wheel assemblies disposed at corners of the lower assembly, such that the wheels of the wheel assemblies contact corners formed by the walls of the upper assembly.

7. The fifth wheel hitch assembly of claim 1, wherein the top configured for attachment to a fifth wheel trailer comprises a top plate having apertures for bolting to the fifth wheel hitch of a fifth wheel trailer.

8. The fifth wheel hitch assembly of claim 1, wherein the top configured for attachment to a fifth wheel trailer comprises a kingpin attachment mechanism comprising a body having an opening for inserting a kingpin therethrough, an open slot through the body and a lock being slidable in the slot to contact an inserted kingpin and retain the kingpin in the opening.

9. The fifth wheel hitch assembly of claim 1, wherein at least one of the rear slide plate, the first side slide plate and the second side slide plate has a convex cross-sectional shape.

10. The fifth wheel hitch assembly of claim 1, wherein the front plate, first side plate and second side plate each curve inwardly as they extend upwards from the bottom structure.

11. The fifth wheel hitch assembly of claim 2, wherein the airspring is disposed between the upper assembly and the lower assembly by attachment to an upper plate in the upper assembly and a lower plate in the lower assembly.

12. The fifth wheel hitch assembly of claim 3, wherein the at least two shook absorbers are disposed between the upper assembly and the lower assembly by attachment to upper mounts in the upper assembly and lower mounts in the lower assembly, the respective upper and lower mounts being disposed in opposite corners of the fifth wheel hitch assembly.

13. The fifth wheel hitch assembly of claim 1, wherein the bottom structure configured for attachment to a connection structure disposed on a tow vehicle comprises a kingpin arm attached to the bottom structure, the kingpin arm moveable to engage a slot in a kingpin disposed on a tow vehicle.

14. The fifth wheel hitch assembly of claim 1, wherein the bottom structure configured for attachment to a connection structure disposed on a tow vehicle comprises a kingpin attached to the bottom structure.

15. The fifth wheel hitch assembly of claim 1, further comprising at least one receiving member attached to the upper assembly, the at least one receiving member comprising a body extending downwards having at least one receiving shelf formed therein and a slidable locking tab attached to the lower assembly, the slidable locking tab movable from a first position away from the at least one receiving member to a second position where a portion of the slidable locking tab is received in the at least one receiving shelf.

16. A fifth wheel hitch assembly, comprising:

an upper assembly configured for attachment to a fifth wheel trailer having a plurality of side walls forming a first enclosure;

a lower assembly configured for attachment to a connection structure disposed on a tow vehicle having a plurality of side walls forming a second enclosure, the second enclosure at least partially residing within said first structure forming a space between said first and second enclosures and form a;

a plurality of bearing structures disposed between said first enclosure and said second enclosure, said plurality of bearing structures facilitating vertical sliding engagement between said first and second enclosures and preventing direct contact between an inside of said first enclosure and an outside of said second enclosure and configured for bearing a transverse load associated with lateral movement between said first enclosure and said second enclosure; and at least one resilient member disposed within the first and second enclosures and coupled at a first end to said upper assembly and at a second end to said lower assembly for absorbing forces between said upper assembly and said lower assembly.

17. The fifth wheel assembly of claim 16, further comprising at least one dampening device coupled between the upper assembly and the lower assembly for dampening motion between said upper assembly and said lower assembly.

18. The fifth wheel assembly of claim 16, wherein the at least one resilient member comprises at least one of an air-spring, a rubber bushing or and a coil spring.

19. The fifth wheel assembly of claim 16, wherein the at least one dampening device comprises at least two shock absorbers disposed between the upper assembly and the lower assembly, the at least two shock absorbers positioned in a diagonally opposed relationship to one another.

20. The fifth wheel assembly of claim 16, wherein the resilient member comprises a rubber bushing or a coil spring.

21. The fifth wheel assembly of claim 20, wherein the at feast one dampening device is disposed between the upper assembly and the lower assembly and at least partially within a central aperture of the rubber bushing or coil spring.

22. The fifth wheel assembly of claim 16, further comprising wheel assemblies disposed between said upper assembly and said lower assembly for guiding movement vertical movement between said upper assembly and said lower assembly.

23. The fifth wheel hitch assembly of claim 16, wherein the upper assembly is configured to be attachment to a kingpin of a fifth wheel trailer.

24. The fifth wheel hitch assembly of claim 23, wherein the upper assembly comprises a kingpin attachment mechanism including a body having an opening for inserting a kingpin therethrough, an open slot through the body and a lock being slidable in the slot to contact an inserted kingpin and retain the kingpin in the opening.

25. The fifth wheel hitch assembly of claim 16, wherein the plurality of bearing structures comprise a plurality of slide plates.

26. The fifth wheel hitch assembly of claim 25, wherein the plurality of slide plates have a convex cross-sectional shape.

27. The fifth wheel hitch assembly of claim 16, wherein the plurality of side walls of the lower assembly curve inwardly.

28. The fifth wheel hitch assembly of claim 16, wherein the at least one resilient member comprises an airspring disposed between the upper assembly and the lower assembly by attachment to an upper plate in the upper assembly and a lower plate in the lower assembly.

29. The fifth wheel hitch assembly of claim 19, wherein the at least two shock absorbers are disposed between the upper assembly and the lower assembly by attachment to upper mounts in the upper assembly and lower mounts in the lower assembly, the respective upper and lower mounts being disposed in opposite corners of the fifth wheel hitch assembly.

30. The fifth wheel hitch assembly of claim 16, wherein the bottom assembly further comprises a kingpin arm moveable to engage a slot in a kingpin disposed on a tow vehicle.

31. The fifth wheel hitch assembly of claim 16, wherein the bottom assembly further comprises a kingpin attached to the bottom plate.

32. The fifth wheel hitch assembly of claim 16, further comprising at least one receiving member attached to the upper assembly, the at least one receiving member comprising a body extending downwards having at least one receiving shelf formed therein and a slidable locking tab attached to the lower assembly, the slidable locking tab movable from a first position away from the at least one receiving member to a second position where a portion of the slidable locking tab is received in the at least one receiving shelf.

* * * * *